United States Patent
Byrne (10) Patent No.: US 12,120,003 B1
(45) Date of Patent: Oct. 15, 2024

(54) METHODS AND SYSTEMS OF PERFORMING TCP FLOW ANALYSIS ACROSS NAT

(71) Applicant: MORGAN STANLEY SERVICES GROUP INC., New York, NY (US)

(72) Inventor: Gavin Byrne, Frederick, MD (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 18/237,318

(22) Filed: Aug. 23, 2023

(51) Int. Cl.
G06F 15/173 (2006.01)
G06F 16/901 (2019.01)
G06F 16/9035 (2019.01)
H04L 43/026 (2022.01)
H04L 43/0852 (2022.01)

(52) U.S. Cl.
CPC ........ H04L 43/026 (2013.01); G06F 16/9017 (2019.01); G06F 16/9035 (2019.01); H04L 43/0852 (2013.01)

(58) Field of Classification Search
CPC ............... H04L 43/026; H04L 43/0852; G06F 16/9017; G06F 16/9035
USPC ......................................................... 709/224
See application file for complete search history.

(56) References Cited

U.S. PATENT DOCUMENTS

| | | | |
|---|---|---|---|
| 7,385,924 B1 * | 6/2008 | Riddle ................ | H04L 41/5022 370/252 |
| 8,331,234 B1 * | 12/2012 | Newton .................. | H04L 43/04 370/231 |
| 9,525,632 B1 * | 12/2016 | Cai ......................... | H04L 47/10 |
| 9,560,072 B1 * | 1/2017 | Xu ....................... | H04L 63/1475 |
| 9,769,038 B1 * | 9/2017 | Baldi ...................... | H04L 43/08 |
| 11,108,812 B1 * | 8/2021 | Krishnan ................ | H04L 45/64 |
| 11,153,190 B1 | 10/2021 | Mahajan et al. | |
| 11,546,240 B2 | 1/2023 | Voderbet et al. | |
| 2005/0018618 A1 * | 1/2005 | Mualem ............. | H04L 63/1458 709/224 |
| 2005/0044171 A1 * | 2/2005 | Bechtel .................... | G06K 1/12 709/217 |
| 2005/0210533 A1 * | 9/2005 | Copeland ............ | H04L 63/1416 726/23 |
| 2007/0180526 A1 * | 8/2007 | Copeland, III ..... | H04L 63/1416 709/224 |

(Continued)

*Primary Examiner* — Thuong Nguyen
(74) *Attorney, Agent, or Firm* — Weitzman Law Offices, LLC (57) ABSTRACT

A system for performing flow analysis across a NAT device comprising a first and second monitoring agent; one or more processors; one or more network interfaces for communicating with the first and second monitoring agents; and non-transitory memory comprising instructions. The instructions cause the one or more processors to receive one or more packets from the first and second monitoring agents for an active TCP connection; generate a set of summary information for the packets received from the first and second monitoring agents; create flow records for each set of summary information; identify one or more flow records that correspond to the active TCP connection using IP address and port number information; annotate each identified one or more flow record with a same flow identifier tag; store the annotated one or more flow records in a database; and perform flow analysis for one or more flows using one or more annotated flow records that correspond to the one or more flows.

18 Claims, 7 Drawing Sheets

(56) References Cited

U.S. PATENT DOCUMENTS

| | | |
|---|---|---|
| 2010/0332641 A1* | 12/2010 | Shanmugasundaram .................... G06F 21/554 709/224 |
| 2015/0016255 A1* | 1/2015 | Bisht ....................... H04L 43/06 370/235 |
| 2015/0081701 A1* | 3/2015 | Lerios ................... G06F 16/955 707/736 |
| 2015/0120856 A1* | 4/2015 | Bennett ................. H04L 41/145 709/213 |
| 2015/0207815 A1* | 7/2015 | Cai ..................... H04L 63/1408 726/22 |
| 2015/0215345 A1* | 7/2015 | Agarwal ............... H04L 69/163 709/227 |
| 2015/0326671 A1* | 11/2015 | Khan .................... H04L 67/141 709/203 |
| 2016/0014033 A1* | 1/2016 | Dosovitsky ............. H04L 47/20 370/235 |
| 2016/0357587 A1* | 12/2016 | Yadav ................. H04L 63/1441 |
| 2018/0131593 A1 | 5/2018 | Jain et al. |
| 2019/0109769 A1* | 4/2019 | Jain ....................... H04L 67/563 |
| 2022/0224620 A1 | 7/2022 | Chhabra et al. |
| 2022/0224622 A1 | 7/2022 | Kamath et al. |
| 2022/0247657 A1 | 8/2022 | Kamath |

* cited by examiner

METHODS AND SYSTEMS OF PERFORMING TCP FLOW ANALYSIS ACROSS NAT

FIELD OF INVENTION

This application relates to systems and methods for performing flow analysis across a network address translation (NAT) device.

BACKGROUND

Packet capture tools are critical to a modern enterprise's capabilities to quickly troubleshoot issues on the network. Large enterprise networks can have hundreds of capture appliances collectively capturing and analyzing trillions of packets and petabytes of data each day.

Because of the volume of data, exporting packet captures can be slow, which means these tools are mostly used in a reactive manner to selectively pull packet captures containing only the data required to troubleshoot a particular issue.

Many packet capture tools can also generate network flow level statistics from the underlying packet capture data, summarizing key metrics for a period of time (for example packet count every one second) where a network flow is most commonly defined by protocol, source IP, source port, destination IP, and destination port.

These flow metrics can be collected on an ongoing basis and then quickly analyzed as a first troubleshooting step before needing to pull packet capture files which can speed up root cause analysis and limiting the impact of the issue.

Being able to see these metrics for a particular flow at multiple capture points as it transits the network greatly increases the speed at which the root cause of an issue can be identified. However, in large enterprise networks it is common for network traffic to traverse devices such as Firewalls, Load Balancers, and Proxy servers which perform NAT (Network Address Translation), SNAT (Secure Network Address Translation), and PAT (Port address Translation) (collectively referred to as NAT), which can alter IPs and ports and make it impossible at times to associate flow level metrics before and after such a device, requiring reverting back to the slow process of pulling packet captures to manually work out the new IPs and ports.

Thus, there is a need for efficiently associating flow level metrics before and after a NAT to allow for faster root cause analysis.

SUMMARY OF THE INVENTION

A system for performing flow analysis across at least one NAT device comprising a first and second monitoring agent: one or more processors; one or more network interfaces for communicating with the first and second monitoring agents before and/or after each NAT device; and non-transitory memory comprising instructions. The instructions cause the one or more processors to receive one or more packets from the first and second monitoring agents for an active TCP connection: generate a set of summary information for the packets received from the first and second monitoring agents; create flow records for each set of summary information: identify one or more flow records that correspond to the active TCP connection using IP address and port number information; annotate each identified one or more flow record with a same flow identifier tag: storing the annotated one or more flow records in a database; and perform flow analysis for one or more flows using one or more annotated flow records that corresponds to the one or more flows.

A computer implemented method for performing flow analysis across at least one NAT device is also disclosed. The method comprises receiving one or more packets from a first and second monitoring agent for an active TCP connection: generating a set of summary information for the packets received from the first and second monitoring agents: creating flow records for each set of summary information: identifying one or more flow records that correspond to the active TCP connection using IP address and port number information; annotating each identified one or more flow record with a same flow identifier tag: storing the annotated one or more flow records in a database; and performing flow analysis for one or more flows using one or more annotated flow records that corresponds to the one or more flows.

BRIEF DESCRIPTION OF THE DRAWINGS

Other aspects, features and advantages will become more fully apparent from the following detailed description, the appended claims, and the accompanying drawings, provided solely for purposes of illustration without restricting the scope of any embodiment:

DETAILED DESCRIPTION

Example embodiments of the present disclosure provide systems and methods which address the issues described above. The present disclosure describes a manner of performing streamlined flow analysis across one or more network address translation ("NAT") devices using a flow management platform. The flow management platform generates a unique flow identifier tag for each active TCP connection. The flow identifier tag is used by the flow management platform to match flow records generated from different points along the end-to-end communication path to a specific flow or multiple flows with a shared property for network analysis. The flow management platform uses the data in the matching flow records to perform network analysis, such as, for example, calculating latency contributed by the one or more NAT devices.

Figure 1:
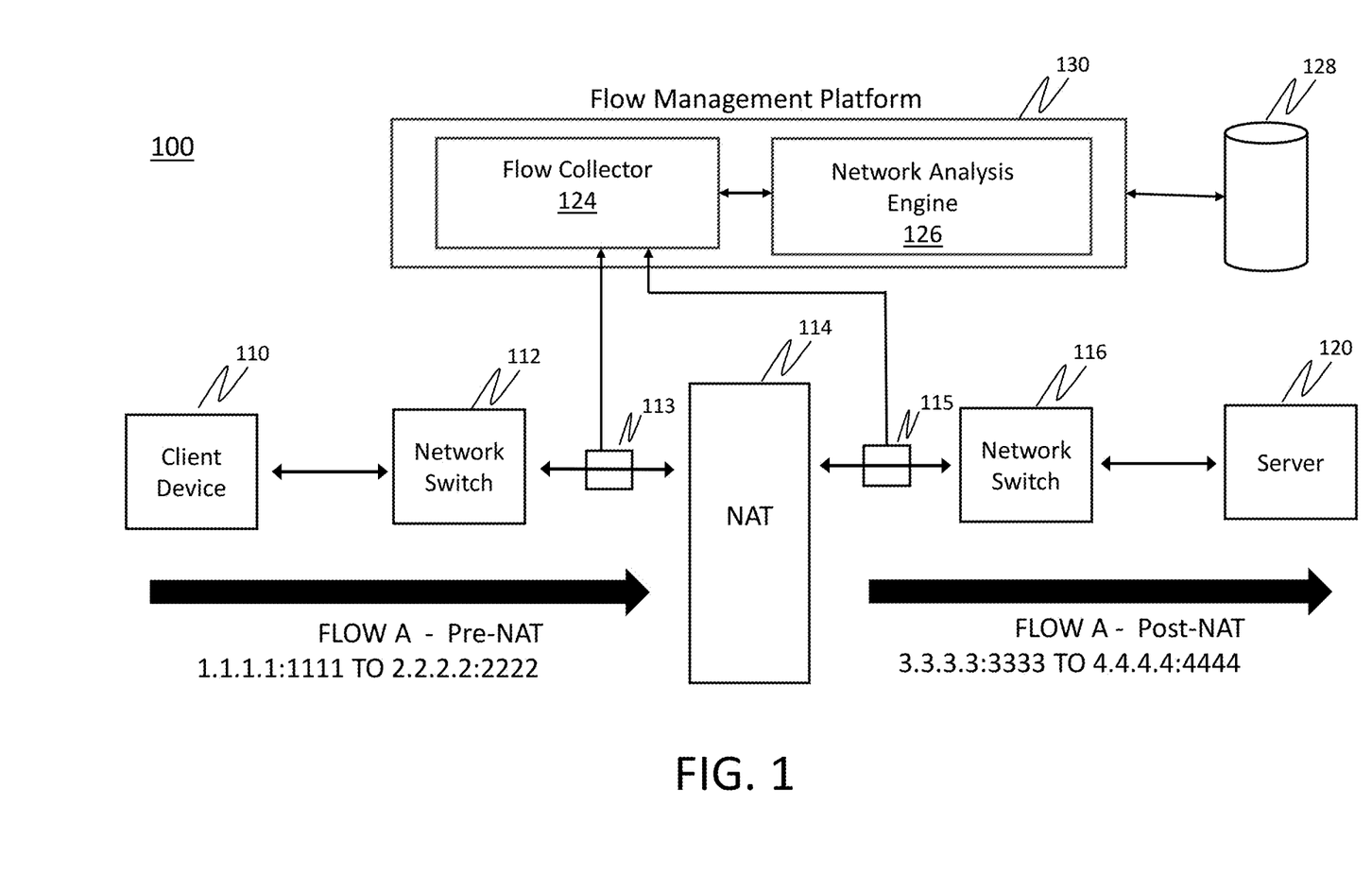
FIG. 1 depicts an illustrative architecture in which techniques and structures for providing the systems and methods disclosed herein may be implemented.

FIG. 1 illustrates an end-to-end communication path for a flow (e.g., Flow A) in an example network environment 100 which is operable to facilitate flow analysis across a network address translation (NAT) device. The network environment ("the system") 100 can include one or more client devices 110, a network switch 112, a first monitoring agent 113, a NAT device 114, a second monitoring agent 115, a network switch 116, a server 120, and a flow management platform 130. All of the network devices in the system 100 are connected by one or more networks using the TCP/IP protocol.

Although the example embodiment shows a first and second monitoring agent, any number of monitoring agents may be included in the system. Moreover, any number of network switches may also be included in the system. In some embodiments, the network environment 100 includes a load balancer and an aggregation switch.

Client device 110 may include a mobile device, a tablet, a laptop device, and/or a personal desktop computer. The client device may execute a user browser to interface with the one or more networks, an email application used to send and receive emails, a text application used to send and receive text messages, and many other types of applications.

Network switch 112 can be implemented as a layer 2 switch that works on the data link layer (OSI Layer 2) and utilizes MAC Address to determine the path through where the frames are to be forwarded. Network switch 116 can be implemented as a layer 3 switch that works on the network layer (OSI Layer 3) and performs routing and forwarding of packets between network nodes.

Monitoring agents 113 and 115 observe packets, turn the packets into flow records and send them to flow Collector 124 in the flow management platform 130. In some embodiments, the monitoring agent may be a flow sensor, a network tap connected to a packet capture device, a flow-enabled switch, a flow-enabled router, a flow-enabled firewall, a software application, or a switch port in a monitor mode, connected to a packet capture device.

Each monitoring agent 113 and 115 is configured to identify a three-way handshake which is achieved to establish an active TCP connection between two endpoints. The monitoring agents generate a flow record for the three-way handshake (i.e., the first flow record for the active TCP connection) including the SYN sequence number, the SYN-ACK sequence number, the protocol, the destination IP address, destination port number, source IP address, source port number, a timestamp for the SYN packet and a timestamp for the SYN-ACK packet. Thereafter, the monitoring agents are configured to combine the individual packets received within a predetermined cyclical time interval (e.g., every 5 msec.) into a flow record, as described further in FIGS. 2-3.

NAT device 114 may be a firewall, load balancer, or any other device that modifies the source or destination IP addresses or ports on packets, including translation from a local private IP address to a global public IP address and vice versa. Furthermore, packets in a particular flow might undergo multiple translations across multiple NAT devices before reaching their destination. The network switches 112, 116 picking up the packets upstream from the first such NAT device and downstream from the last such NAT device may be augmented, if necessary, by additional network switches placed between any two such NAT devices in the flow's path.

Server 120 may be configured as a web server, application server, email server, file server, gaming server or any other type of suitable server or combination of servers.

The one or more networks may include any one or a combination of multiple different types of networks, such as cable networks, the Internet, wireless networks, and other private and/or public networks. In some instances, the network may include cellular, Wi-Fi, or Wi-Fi direct. Further, the one or more networks may include a local area network (LAN) or wide area network (WAN) (e.g., the Internet) or any other suitable network for the transmitting of data from a source to a destination.

The flow management platform 130 includes a flow collector 124, a network analysis engine 126, and at least one data storage device 128. The flow collector receives flow records from the first and second monitoring agents, performs preprocessing on the flow records and stores the preprocessed flow records in a database in the at least one data storage device 128. The network analysis engine reads the preprocessed records from the flow collector, performs analysis, and produces reports.

The flow management platform 130 may be configured with one or more servers, distributed computing systems, and/or cloud-based computer systems. The flow management platform includes one or more processors, one or more network interfaces, a non-transitory memory including computer executable instructions, and one or more databases.

An end-to-end communication path for FLOW A is shown Pre-NAT (i.e., before passing through NAT device 114) and Post-NAT (i.e., after passing through NAT device 114) in FIG. 1. A flow is a series of packets that are transmitted during an active TCP connection. The flow originates at client device 110 and traverses one or more networks using the TCP/IP protocol to destination server 120. A first network including client device 110, network switch 112 and NAT device 114 may be configured as a local area network (LAN). A second network comprising network switch 116 and server 120 may be configured as a wide area network (WAN). Along each network, a monitoring agent may be deployed to capture packets passing through the network for subsequent analysis. In other embodiments, different configurations of networks may exist on either side of the NAT device 114, such as a WAN on both sides, LAN on both sides, or the NAT device 114 connecting to a single network but permitting VPN, anonymization, or other services to computers on the single network.

Figure 2:
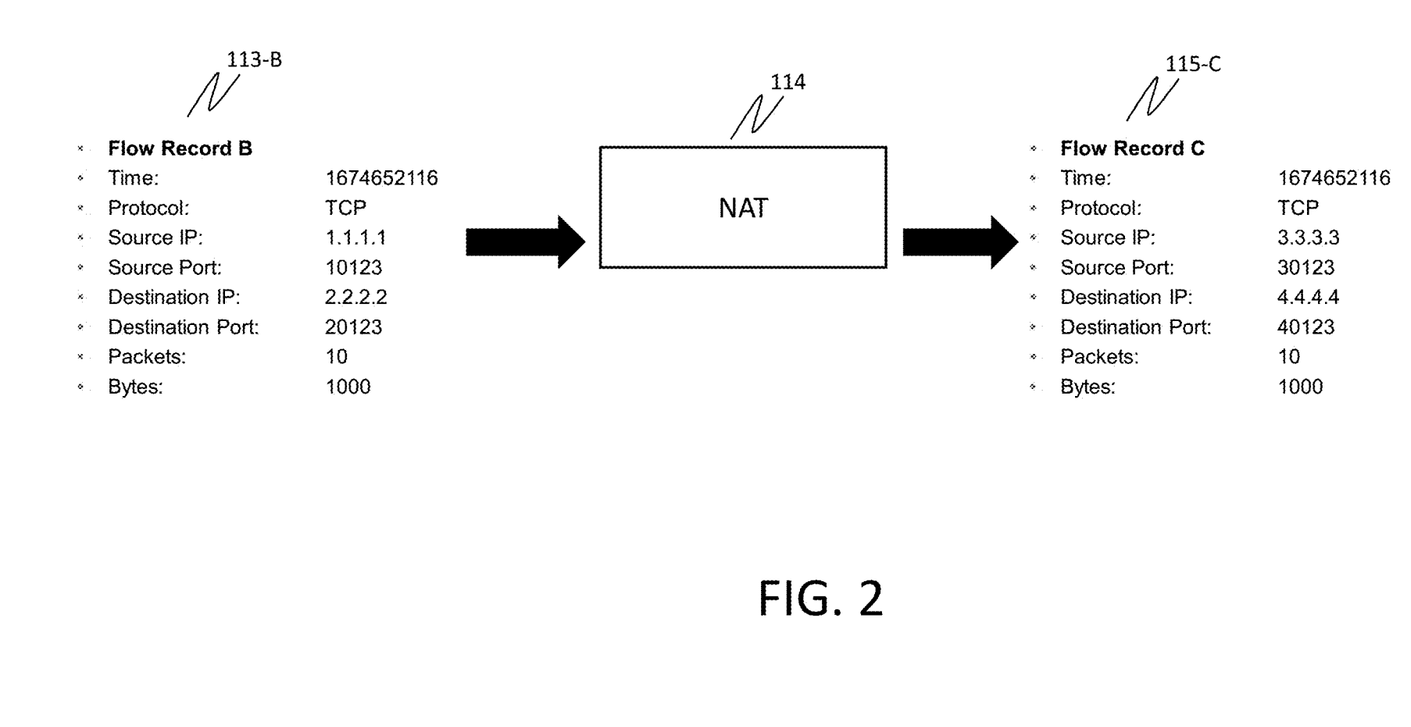
FIG. 2 depicts example flow records as used by methods disclosed herein.

For example, a monitoring agent 113 may be deployed in the first network to capture packets transmitted from a first network device (e.g., network switch 112) to a second network device (e.g., NAT device 114), and a second monitoring agent 115 may be deployed in a second network to capture packets transmitted from the second device (i.e., NAT device 114) to a third device (e.g., network switch 116). Each monitoring agent combines the individual packets received within a predetermined cyclical time interval (e.g., every 5 msec.) into a flow record. Summary information, such as, for example, flow properties and flow features for a specific time period, is generated for the received packets and is included in the flow record. FIG. 2 illustrates an example flow record 113-B generated by monitoring agent 113 and an example flow record 115-C generated by monitoring agent 115.

Flow records 113-B and 115-C both correspond to packets transmitted during the same active TCP connection, and thus are associated with the same flow. Typically, packets belonging to the same flow share the same source and destination IP addresses, source and destination ports and IP protocol. However, when packets traverse a NAT device (e.g., NAT device 114), the Pre-NAT IP address (e.g., 1.1.1.1) and port number (e.g., 111) are reassigned to a different IP address (e.g., 3.3.3.3) and port number (e.g., 3333) Post-NAT. Hence, further processing is required when trying to identify flow records belonging to the same flow when the packets traverse a NAT device.

In an example embodiment, flow management platform 130 performs preprocessing on the flow records received from the first and second monitoring agents. The flow records are preprocessed to aid in quickly identifying flow records that belong to the same flow. Preprocessing the records includes identifying all of the flow records belonging to the same flow and associating the identified flow records with a unique flow identifier tag, as described further in FIG. 5. Turing to FIG. 3, example preprocessed flow records 113-B and 115-C are illustrated. A unique flow identifier tag "674742921224141" has been added to each flow record. The flow identifier tag will aid in identifying all of the flow records belonging to the same flow when a flow analysis is performed.

Figure 4:
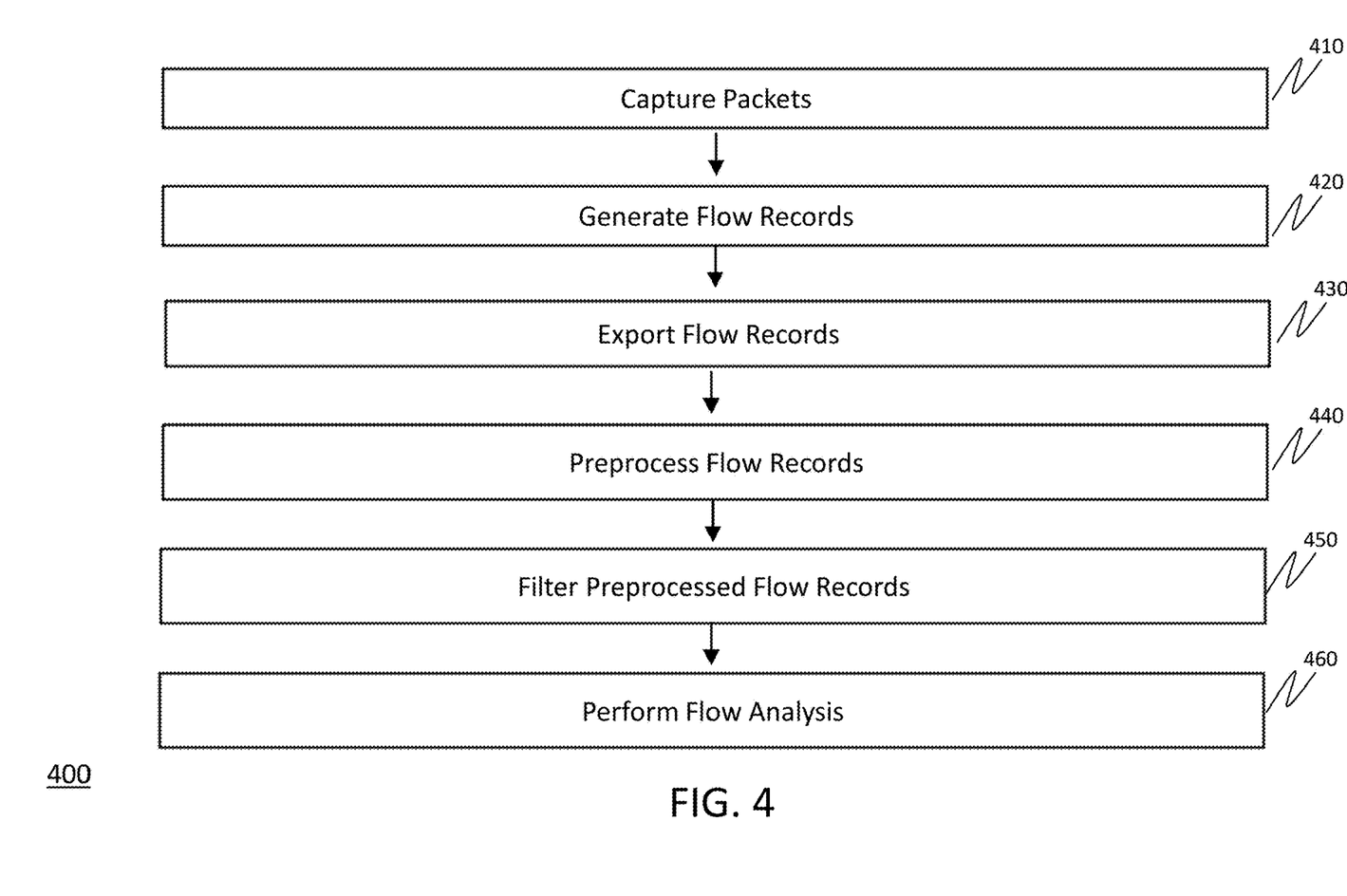
FIG. 4 depicts a high level flow diagram of performing flow analysis across a network address translation device according to an embodiment of the present disclosure.

Turning to FIG. 4, an example high level flow diagram 400 of a method for performing flow analysis across one or more NAT devices is illustrated according to an embodiment of the present disclosure.

At step 410, monitoring agents 113 and 115 capture packets traversing the networks as described above.

Figure 3:
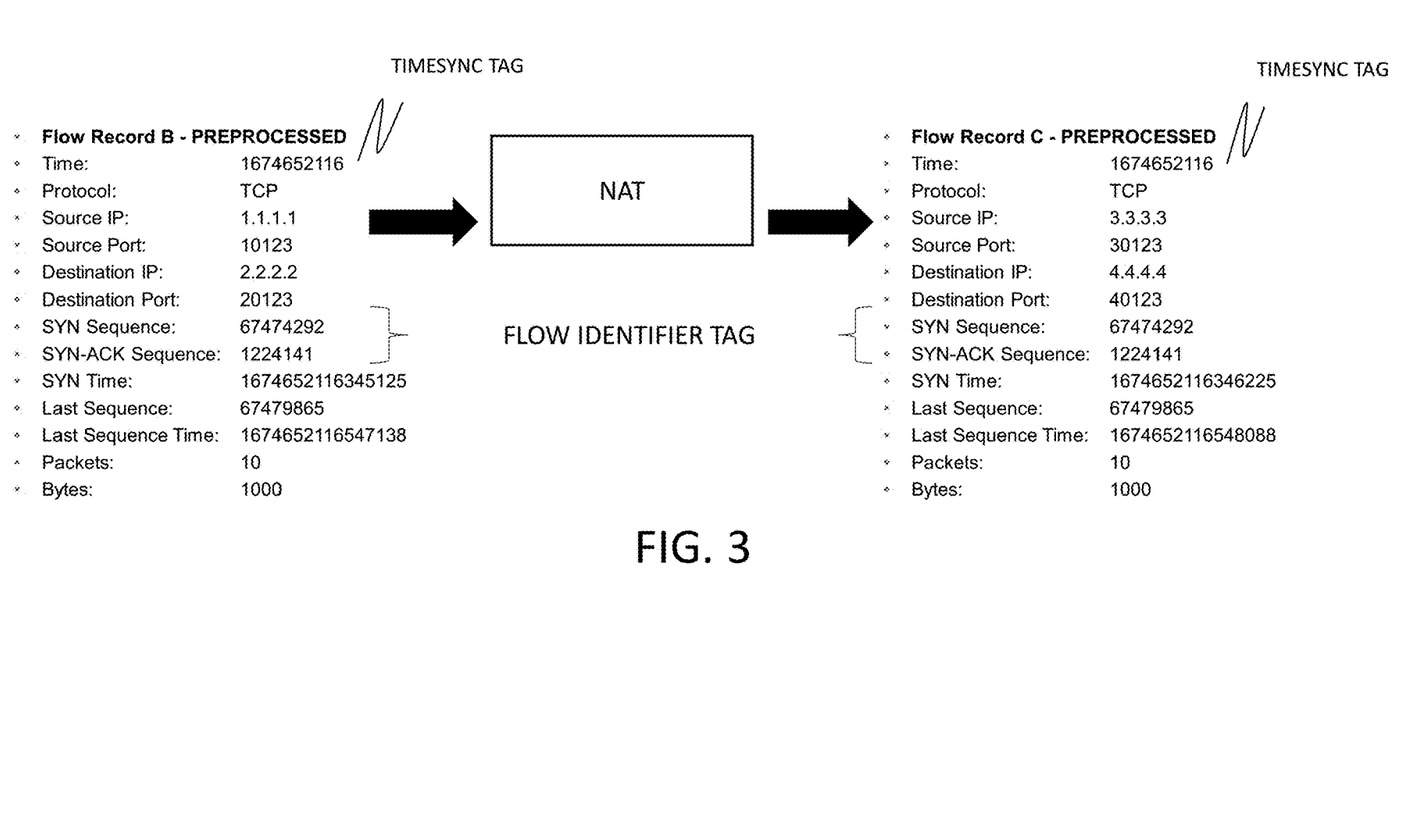
FIG. 3 depicts example preprocessed flow records as used by methods disclosed herein.

At step 420, each monitoring agent generates flow records at a predetermined cyclical time interval for the packets received during a corresponding time interval. The flow records each include summary information pertaining to the packets received. Referring to FIG. 2, the summary information may include a timesync tag (e.g., "1674652116"), protocol information (e.g., TCP), source IP address, source port number, destination IP address, destination port number, number of packets received, and number of bytes received. In some embodiments, as shown in FIG. 3, each flow record may include a timestamp for the SYN packet received during the TCP handshake process (i.e., SYN Time), a timestamp for the last packet received (i.e., Last Sequence Time), and the sequence number for the last packet received (i.e., Last Sequence). In some embodiments, the flow record also stores an identifier for the source monitoring agent which generated the record.

At step 430, the monitoring agents export the flow records to the flow management platform 130.

Figure 5:
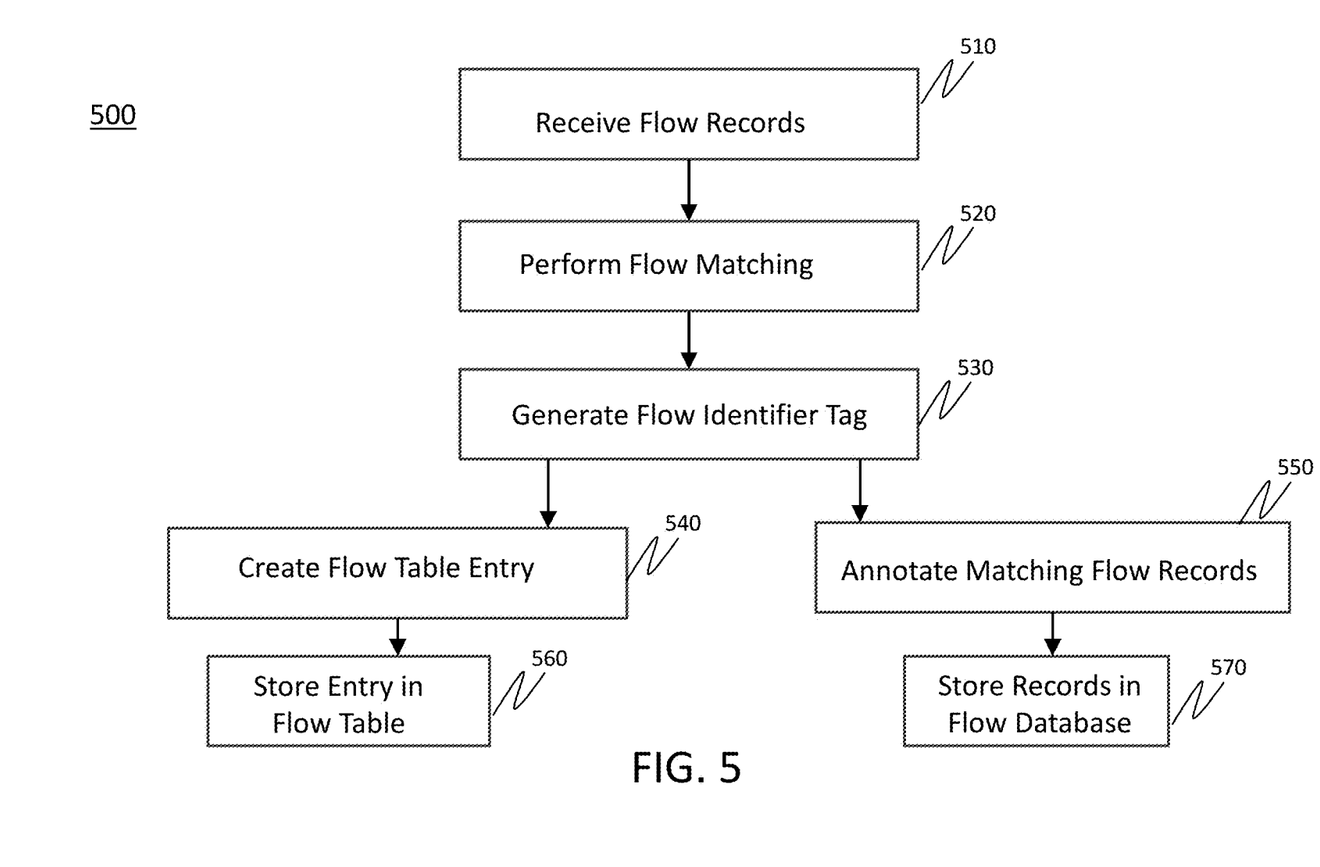
FIG. 5 depicts a high level flow diagram of preprocessing flow records according to an embodiment of the present disclosure.

At step 440, the flow collector 124 in the flow management platform preprocesses the flow records received from the first and second monitoring agents, as further described in FIG. 5.

At step 450, the flow collector 124 filters the preprocessed flow records in response to receiving a request for the flow records associated with a specific flow, or with all flows matching a particular criterion or set of criteria. For example, a query may be performed to obtain all flows originating at a particular address, regardless of destination; for all flows directed to a particular address, regardless of source; for all flows that passed through a particular intermediate device, such as a load balancer or firewall: for all flows using a particular port when initiated (hinting at the use of a particular software or protocol); for all flows that occurred within a particular time window; etc. The flow collector stores the preprocessed flow records in a database in the data storage device 128. As a result, when a request for flow records for a specific flow or group of flows is received, the flow collector first looks up the flow identifier tag(s) associated with the flow(s) in the flow table, described further in FIG. 5, and then queries the database for flow records having a flow identifier tag matching the flow(s). The flow collector exports the identified records to the network analysis engine 126 for further processing.

Figure 6:
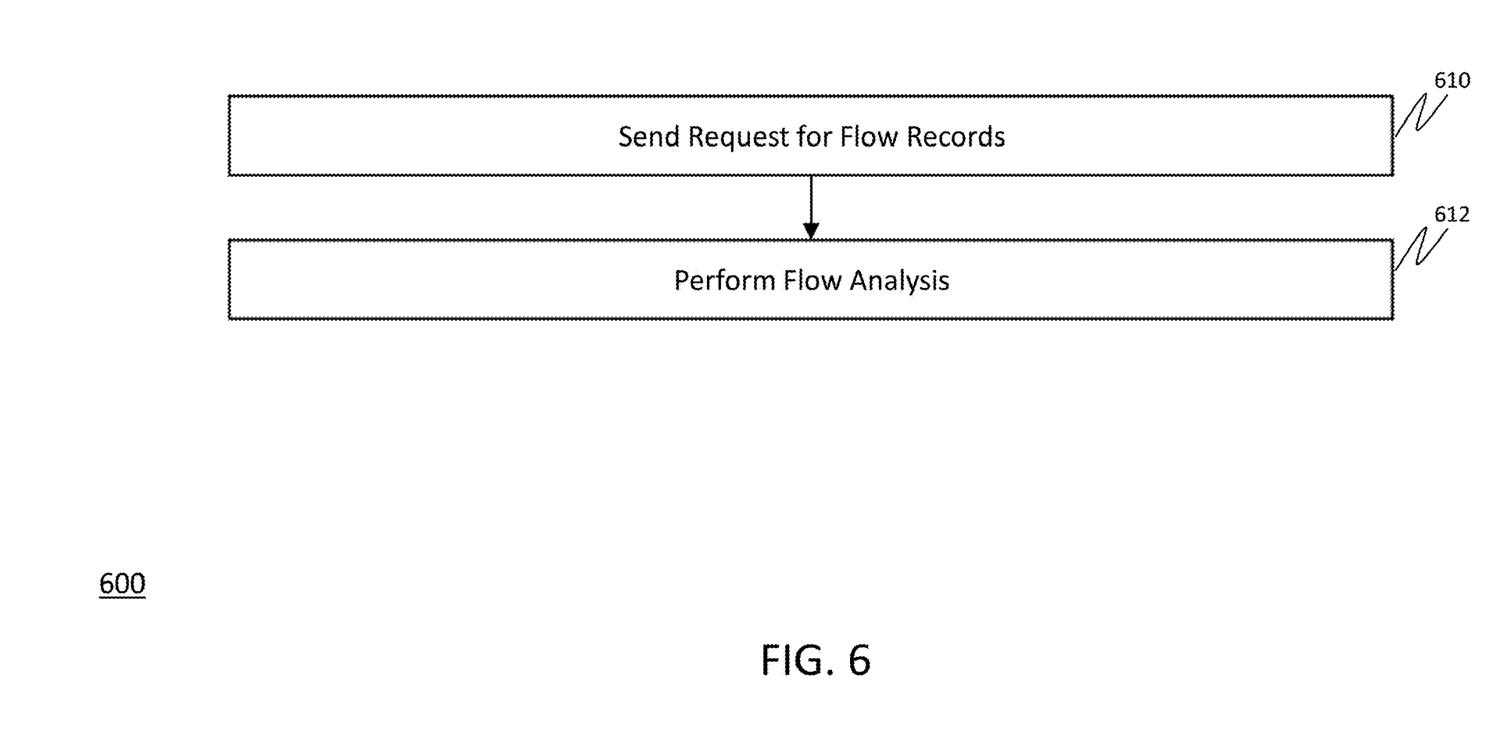
FIG. 6 depicts a high level flow diagram of a flow analysis process according to an embodiment of the present disclosure.

At step 460, the network analysis engine performs flow analysis, as further described in FIG. 6.

Turning to FIG. 5, an example high level flow diagram 500 of preprocessing flow records is illustrated according to an embodiment of the present disclosure.

At step 510, the flow collector receives flow records from the first and second monitoring agents 113, 115.

At step 520, the flow collector performs flow matching by searching the flow records to find the records having matching source IP addresses, source port numbers, monitoring agent identifiers, destination IP addresses, and destination port numbers. The flow records generated at monitoring agent 113 will have matching source IP addresses, source port numbers, monitoring agent identifiers, destination IP addresses, and destination port numbers for the same active TCP connection. Likewise, the flow records generated at monitoring agent 115 will have matching source IP addresses, source port numbers, monitoring agent identifiers, destination IP addresses, and destination port numbers for the same active TCP connection. Thus, the flow collector may perform flow matching separately for the records received from the first monitoring agent and the records received from the second monitoring agent.

After the flow records are matched for each monitoring agent, the flow collector generates a unique flow identifier tag for all of the records, at step 530. The flow collector generates the flow identifier tag using the SYN sequence number and the SYN-ACK sequence number stored in the first flow record generated by each monitoring agent for the same active TCP connection. Since any NAT device 114 along the flow only changes the IP addresses and the port numbers and does not terminate the active TCP connection, when the packets traverse the NAT, the sequence numbers for the SYN and SYN-ACK packets of the three way handshake will remain the same Pre-NAT and Post-NAT. As such, the flow identifier tag will be the same for the records received from both monitoring agents 113, 115, and therefore, can be used to link the flow records received Pre-NAT and Post-NAT to the same flow.

The flow collector 124 creates a flow table linking the flow identifier tags to particular flows. At step 540, the flow collector creates a flow table entry for the flow identifier tag generated at step 530 and stores the flow table entry in the flow table at step 560. So, for example, a table entry may include a reference to a particular flow (Flow A) and a corresponding flow identifier tag (674742921224141).

At step 550, the flow collector stores the flow identifier tag in each matched flow record thereby creating annotated flow records and stores the annotated flow records in a flow database in the data storage device 128 at step 570.

Turning to FIG. 6, a high level flow diagram 600 of a flow analysis process is illustrated according to an embodiment of the present disclosure.

At step 610, the network analysis engine 126 sends a request to flow collector 124 to retrieve the flow records for a particular flow (e.g., Flow A). At step 612, the network flow engine performs flow analysis for the particular flow using the information in the flow records.

In some embodiments, the network analysis engine 126 may determine an ongoing sampling of NAT latency (i.e., the latency contributed specifically by NAT device 114 or any other NAT device along the flow) by matching the last sequence numbers stored in the Pre-NAT flow records and Post-NAT flow records and calculating the time difference using the Last Sequence Time recorded in each corresponding Pre-NAT flow record and Post-NAT flow record. For example, referencing the data in FIG. 3, the Pre-NAT flow record (Flow Record B) has a Last Sequence number "67479865" and has a Last Sequence Time of "1674652116547138", the corresponding Post-NAT flow record (Flow Record C) has a matching Last Sequence number "67479865" and has a Last Sequence Time of "1674652116548088". The network engine can determine the NAT latency by calculating the difference between the two Last Sequence Times using the numbers after the Timesync Tag (i.e., 1674652116), which is 548088-547138. In this instance, the NAT latency is 950 μs.

In some embodiments, the network analysis engine 126 may determine an initial latency through the NAT device 114 using the SYN Time information recorded in the first flow records from each monitoring agent, again, by calculating the difference between the two times.

In addition to determining values such as latency for a single flow, more complicated statistical analysis or aggregation may be performed on sets of flows. In examples such as those previously mentioned where a query is performed for all flows originating at, passing through, or terminating at a particular device/address, the retrieved flow records may be used to calculate total packet count across all matching flows, total byte count across all matching flows, total TCP zero window count across all matching flows, enabling analysis of how these types of metrics differ on each side of a NAT device, as well as minimum/mean/maximum NAT device latency among all matching flows, quartile/decile/percentile distributions of NAT device latency among all matching flows, and so on.

The information gathered via the flow analysis may be used for a variety of purposes. One purpose, already described above, concerns providing information to a human user for purposes of root cause analysis when a network issue is detected. Other uses such as statistical analysis and reporting may be helpful even when no network issue occurs, to establish a baseline for detecting future anomalies or to assure a technician that no undetected network issue is occurring.

In some embodiments, an automatic action might be taken in response to identification of an unacceptably high latency in a flow, or any other anomaly in the flow or failure to meet a performance metric. An automatic action might include, for example, causing a router to shut down or reboot so that network traffic is temporarily routed around it: causing a load balancer to assign traffic in a different configuration to avoid a congested path or a malfunctioning node; causing a firewall to change settings or routing criteria, such as blocking non-essential traffic, blocking traffic from certain sources, or prioritizing traffic from certain sources; or any other automated action that changes the flow of packets through a network.

Figure 7:
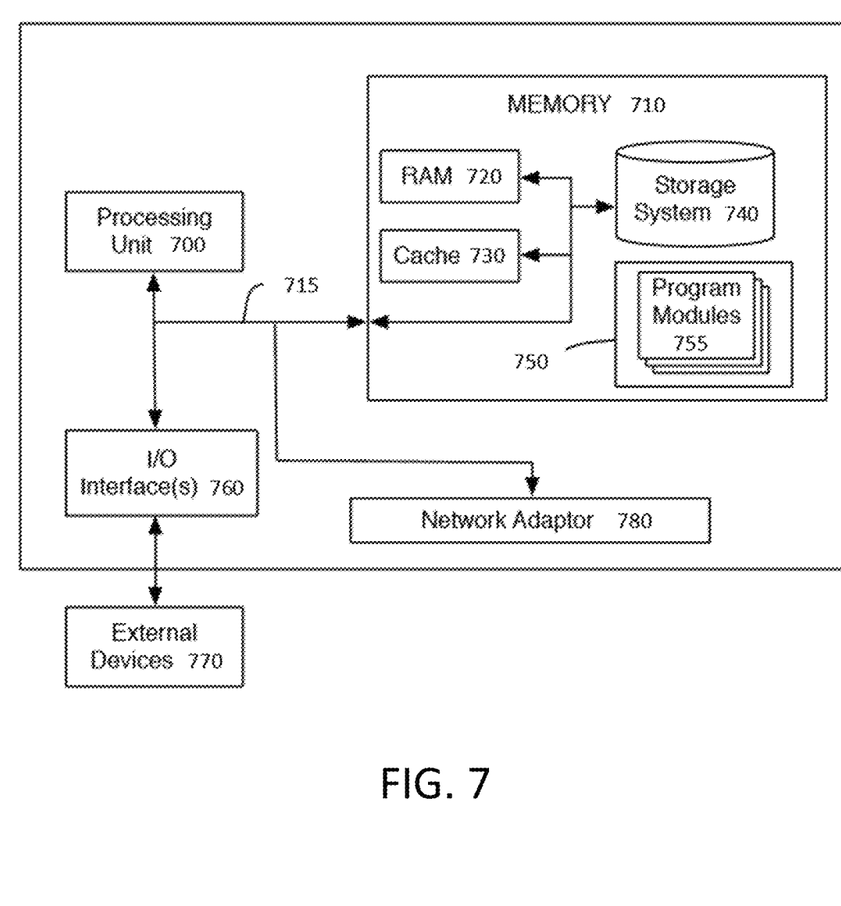
FIG. 7 is a high-level block diagram of a representative computing device that may be utilized to implement various features and processes described herein.

Although FIG. 1 depicts a preferred configuration of specific computing devices for accomplishing the software-implemented methods described above, those methods do not inherently rely on the use of any particular specialized computing devices, as opposed to standard desktop computers and/or web servers. For the purpose of illustrating possible such computing devices, FIG. 7 is a high-level block diagram of a representative computing device that may be utilized to implement various features and processes described herein. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 7, the components of the computing device may include (but are not limited to) one or more processors or processing units 700, a system memory 710, and a bus 715 that couples various system components including memory 710 to processor 700.

Bus 715 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 700 may execute computer programs stored in memory 710. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 700 may be used.

The computing device typically includes a variety of computer system readable media. Such media may be any available media that is accessible by the computing device, and it includes both volatile and non-volatile media, removable and non-removable media.

System memory 710 can include computer system readable media in the form of volatile memory, such as random access memory (RAM) 720 and/or cache memory 730. The computing device may further include other removable/non-removable, volatile/non-volatile computer system storage media. By way of example only, storage system 740 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 715 by one or more data media interfaces. As will be further depicted and described below, memory 710 may include at least one program product having a set (e.g., at least one) of program modules that are configured to carry out the functions of embodiments described in this disclosure.

Program/utility 750, having a set (at least one) of program modules 755, may be stored in memory 710 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 770 such as a keyboard, a pointing device, a display, etc.: one or more devices that enable a user to interact with the computing device; and/or any devices (e.g., network card, modem, etc.) that enable the computing device to communicate with one or more other computing devices. Such communication can occur via Input/Output (I/O) interface(s) 760.

In addition, as described above, the computing device can communicate with one or more networks, such as a local area network (LAN), a general wide area network (WAN) and/or a public network (e.g., the Internet) via network adaptor 780. As depicted, network adaptor 780 communicates with other components of the computing device via bus 715. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer implemented method of performing flow analysis across at least one NAT (network address translation) device, the method comprising the steps of:
   receiving one or more packets from a first monitoring agent positioned at a first capture point for an active TCP connection before network address translation of the one or more packets has occurred;
   receiving one or more packets from a second monitoring agent positioned at a second capture point for the active TCP connection after network address translation of the one or more packets has occurred;
   generating a set of summary information for the one or more packets received from the first and second monitoring agents for a corresponding cyclical time interval;
   creating a flow record for each set of summary information;
   identifying one or more flow records that correspond to the active TCP connection using IP address and port number information;
   annotating each identified one or more flow record with a same flow identifier tag generated using a SYN sequence number and SYN-ACK sequence number from a three-way handshake establishing the active TCP connection, and from which the SYN sequence number and SYN-ACK sequence number can be extracted;
   storing the annotated one or more flow records in a database; and
   performing flow analysis for one or more flows using the one or more same flow identifier tags from one or more annotated flow records that correspond to the one or more flows.

2. The method of claim 1 further comprising filtering the database, in response to receiving a request for flow records corresponding to one or more flows, for one or more annotated flow records having a matching flow identifier tag that corresponds to the one or more flows.

3. The method of claim 1 further comprising creating a flow table linking a particular flow to a corresponding flow identifier tag.

4. The method of claim 1 wherein the first capture point is upstream from the at least one NAT device.

5. The method of claim 1 wherein the second capture point is downstream from the at least one NAT device.

6. The method of claim 1 wherein the set of summary information for the one or more flow records are generated continually at the end of each cyclical time interval.

7. The method of claim 1 wherein the set of summary information includes a last packet sequence number and a corresponding timestamp.

8. The method of claim 1 wherein the set of summary information includes a SYN timestamp.

9. The method of claim 1 wherein the flow analysis performed for the one or more flows includes calculating latency across the at least one NAT device.

10. A system for performing flow analysis across at least one NAT (network address translation) device, the system comprising:
    at least one first monitoring agent;
    at least one second monitoring agent;
    one or more storage devices, including at least one database;
    one or more processors;
    one or more network interfaces for communication with the at least one first monitoring agent and the at least one second monitoring agent; and
    a non-transitory memory comprising instructions that, when executed by the one or more processors, cause the one or more processors to:
       receive one or more packets from the first monitoring agent positioned at a first capture point for an active TCP connection before network address translation of the one or more packets has occurred;
       receive one or more packets from the second monitoring agent positioned at a second capture point for the active TCP connection after network address translation of the one or more packets has occurred;
       generate a set of summary information for the one or more packets received from the first and second monitoring agents for a corresponding cyclical time interval;
       create a flow record for each set of summary information;
       identify one or more flow records that correspond to the active TCP connection using IP address and port number information;
       annotate each identified one or more flow record with a same flow identifier tag generated using a SYN sequence number and SYN-ACK sequence number from a three-way handshake establishing the active TCP connection, and from which the SYN sequence number and SYN-ACK sequence number can be extracted;
       store the annotated one or more flow records in a database; and
       perform flow analysis for one or more flows using the one or more same flow identifier tags from one or more annotated flow records that correspond to the one or more flows.

11. The system of claim 10 wherein the non-transitory memory further comprises instructions that, when executed by the one or more processors, cause the one or more processors to:
    filter the database, in response to receiving a request for flow records corresponding to the one or more flows, for one or more annotated flow records having a matching flow identifier tag that corresponds to one of the one or more flows.

12. The system of claim 10 wherein the non-transitory memory further comprises instructions that, when executed by the one or more processors, cause the one or more processors to:
    create a flow table linking each of the one or more flows to a corresponding flow identifier tag.

13. The system of claim 10 wherein the first capture point is upstream from the at least one NAT device.

14. The system of claim 10 wherein the second capture point is downstream from the at least one NAT device.

15. The system of claim 10 wherein the set of summary information for the one or more flow records are generated continually at the end of each cyclical time interval.

16. The system of claim 10 wherein the set of summary information includes a last packet sequence number and a corresponding timestamp.

17. The system of claim 10 wherein the set of summary information includes a SYN timestamp.

18. The system of claim 10 wherein the flow analysis performed for the one or more flows includes calculating latency across the at least one NAT device.

* * * * *